United States Patent [19]

Ogihara et al.

[11] Patent Number: 4,938,033
[45] Date of Patent: Jul. 3, 1990

[54] AUTOMATIC AIR CONDITIONING SYSTEM FOR AUTOMOTIVE VEHICLES

[75] Inventors: Yoshiyuki Ogihara; Junichiro Hara; Hideo Takahashi, all of Kanagawa, Japan

[73] Assignee: Nissan Motor Co., Ltd., Japan

[21] Appl. No.: 349,437

[22] Filed: May 9, 1989

[30] Foreign Application Priority Data

May 10, 1988 [JP] Japan .................. 63-113293

[51] Int. Cl.⁵ .................... G05D 23/00; F25B 29/00
[52] U.S. Cl. .................... 62/186; 62/244;
 98/2.01; 236/49.3; 236/91 F; 165/16; 165/43
[58] Field of Search ............... 62/179, 180, 186, 243,
 62/244; 236/49.1, 49.3, 49.4, 49.5, 91 R, 91 C,
 91 D, 91 F, 91 G, 1 B, 1 C, 13; 98/2.01; 165/16,
 22, 27, 28, 30, 41, 42, 43

[56] References Cited

U.S. PATENT DOCUMENTS

| | | | |
|---|---|---|---|
| 4,571,950 | 2/1986 | Nariao et al. | 62/180 X |
| 4,671,458 | 6/1987 | Fukuda et al. | 236/49.3 |
| 4,738,116 | 4/1988 | Himeno et al. | 62/186 |
| 4,819,715 | 4/1989 | Kobayashi | 98/2.01 X |
| 4,852,798 | 8/1989 | Ito et al. | 236/91 F |
| 4,858,677 | 8/1989 | Doi et al. | 98/2.01 X |

FOREIGN PATENT DOCUMENTS 57-15008 1/1982 Japan .
0131145 6/1987 Japan .................. 62/179

Primary Examiner—Harry B. Tanner
Attorney, Agent, or Firm—Leydig, Voit & Mayer

[57] ABSTRACT

An automatic air conditioning system for automotive vehicles including discharge outlets for discharging conditioned air comprises a plurality of louvers utilizing a number of fins, a discharge outlet actuator for controlling the fins, and a controller for determining that the environmental conditions of the vehiclular cabin are in either, a cool-down state wherein a cabin temperature in the vehicular cabin is excessively higher than a target cabin temperature, a steady state wherein the cabin temperature is essentially equal to the target cabin temperature, or a transient state between the cool-down state and the steady state. The controller controls the discharge outlet actuator so as to vary the discharge mode of the conditioned air discharged from the discharge outlets in one of three discharge modes in response to the environmental conditions. The controller controls the discharge mode such that the occupant in the vehicular cabin can feel suitably cool under the environmental conditions in the vehicular cabin which is momentarily changed.

10 Claims, 11 Drawing Sheets

AUTOMATIC AIR CONDITIONING SYSTEM FOR AUTOMOTIVE VEHICLES

BACKGROUND OF THE INVENTION

1. Field of the Invention

The present invention relates to an automatic air conditioning system for automotive vehicles. Specifically to a system which is capable of controlling the discharge mode in response to the environmental conditions in an automotive vehicle, such as a cool-down state wherein an essentially large amount of conditioned air with a relatively low temperature is discharged from a discharge outlet into the vehicular cabin, a steady state wherein temperature in the vehicular cabin is essentially equal to a target cabin temperature (target room temperature) determined by a vehicle occupant, or a transient state between the cool-down state and the steady state.

2. Description of the Prior Disclosure

Recently, there have been proposed and developed various automatic air conditioning systems with a controller which controls the opening angle of doors, such as a switchable fresh/recirculation air intake door, an air mix door, a defroster door, a chest vent duct door, a foot vent duct door, or the like, and controls amount of air flowing through the evaporator of the air conditioning system in response to control signals from various sensors for detecting various physical quantities, such as ambient temperature, temperature in the vehicular cabin, magnitude of insolation or the like. In general, such an automatic air conditioning system controls the discharge outlets in two discharge modes to maintain comfortable conditions in the vehicular cabin. One such automatic air conditioning system has been disclosed in the Japanese Patent First Application (Tokkai Showa) No. 57-15008.

In such automatic air conditioning systems for automotive vehicles, front discharge outlets, such as a center vent and a side vent, are provided in the instrument panel mounted on the front wall of the vehicular cabin 7. Each front discharge outlet includes a louver with a plurality of fins. Each louver is associated with a discharge outlet actuator for actuating the fins thereof. In general, the fins of the louvers are operated in either a first discharge mode or a second discharge mode according to the movement of the actuator. In the first discharge mode, an essentially large amount of conditioned air flowing through the fins is concentratedly discharged from a front discharge outlet to the occupants of the front seats. On the other hand, in the second discharge mode, the conditioned air flowing through the fins is diffused to all regions within the vehicular cabin. The former mode will be hereinafter referred to as "concentrated discharge mode", while the latter will be referred to as "diffuse discharge mode". During a cool-down state, the occupants of the front seats in the vehicular cabin may quickly feel a cooling effect via the concentrated discharge mode control. When environmental conditions in the vehicular cabin transit from the cool-down state to the steady state, the air conditioning system can prevent excessive cooling via the diffuse discharge mode control.

However, actually, in a transition from the cool-down state to the steady state, the environmental conditions in the vehicular cabin vary momentarily according to the lowering of the cabin temperature or discharge air temperature from the discharge outlets. Usually, when the air conditioning system is continuously operated in the diffuse discharge mode, the occupants in the vehicular cabin lose feeling relative to a cooling effect. Therefore, the two discharge modes of prior art air conditioning systems cannot provide sufficiently comfortable conditions in the vehicular cabin or optimum feeling of the occupants. In other words, a smooth transition between the cool-down state and the steady state cannot be satisfied sufficiently.

SUMMARY OF THE INVENTION

It is, therefore in view of the above disadvantages, an object of the present invention to provide an automatic air conditioning system for automotive vehicles, which can provide the optimum feeling of the occupants in a vehicular cabin in response to conditions in the environment in an automotive vehicle which vary momentarily according to changes in cabin temperature.

It is another object of the invention to provide an automatic air conditioning system for automotive vehicles, which can provide the optimum feeling of the occupants taking both the front and rear seats of a vehicular cabin.

It is a further object of the invention to provide an automatic air conditioning system for automotive vehicles, which is capable of cooling both the front and rear compartments of a vehicular cabin efficiently.

In order to accomplish the aforementioned and other objects, an automatic air conditioning system for automotive vehicles having at least one discharge outlet to discharge conditioned air therethrough comprises sensor means for monitoring the environmental condition of the vehicular cabin for producing a sensor signal indicative thereof, variable means associated with the discharge outlet for varying the discharge mode of the conditioned air discharged therefrom, the variable means being operable in a first discharge mode wherein the conditioned air is concentratedly discharged to an occupant of the vehicular cabin, a second discharge mode wherein the conditioned air is discharged in a manner so as to be diffused to all regions within the vehicular cabin, and a third discharge mode wherein the conditioned air is oscillatingly discharged to the occupant, and discharge control means deriving a control value indicative of a heat demand on the basis of the sensor signal and a target temperature in the vehicular cabin. The discharge control means operates the variable means at the first discharge mode when the control value is within the range of a first predetermined values satisfying a first environmental condition, at the second discharge mode when the control value is within the range of a second predetermined values satisfying a second environmental condition, and at the third discharge mode when the control value is within the range of a third predetermined values satisfying a third environmental condition.

Preferably, the third discharge mode may be combined with a controlled variation of the blower speed. The third discharge mode is executed such that the first and second discharge modes are alternately repeated, thereby resulting in oscillation of the direction and/or the amount of discharge of the conditioned air from the discharge outlet.

According to another aspect of the invention, an automatic air conditioning system for automotive vehicles having at least one front discharge outlet to discharge conditioned air to an occupant of the front seat in the vehicular cabin and at least one rear discharge outlet to discharge conditioned air to an occupant of the rear seat in the vehicular cabin comprises sensor means for monitoring the environmental condition of the vehicular cabin for producing a sensor signal indicative thereof, first variable means associated with the front discharge outlet for varying the discharge mode of the conditioned air discharged therefrom, the first variable means being operable in a first front discharge mode wherein the conditioned air is concentratedly discharged to the occupant of the front seat, a second front discharge mode wherein the conditioned air is discharged in a manner so as to be diffused to a front compartment of the vehicular cabin, and a third front discharge mode wherein the conditioned air is oscillatingly discharged to the occupant of the front seat, second variable means associated with the rear discharge outlet for varying the discharge mode of the conditioned air discharged therefrom, the second variable means being operable in a first rear discharge mode wherein the conditioned air is concentratedly discharged to the occupant of the rear seat, a second rear discharge mode wherein the conditioned air is discharged in a manner so as to be diffused to a rear compartment of the vehicular cabin, and a third rear discharge mode wherein the conditioned air is oscillatingly discharged to the occupant of the rear seat, and discharge control means deriving a control value indicative of a heat demand on the basis of the sensor signal and a target temperature in the vehicular cabin. The discharge control means operates the first variable means at the first front discharge mode when the control value is within the range of a first predetermined values satisfying a first environmental condition, at the second front discharge mode when the control value is within the range of a second predetermined values satisfying a second environmental condition, and at the third front discharge mode when the control value is within the range of a third predetermined values satisfying a third environmental condition. The discharge control means also operates the second variable means at the first rear discharge mode when the control value is within the range of a first predetermined values satisfying a first environmental condition, at the second rear discharge mode when the control value is within the range of a second predetermined values satisfying a second environmental condition, and at the third rear discharge mode when the control value is within the range of a third predetermined values satisfying a third environmental condition. The discharge control means preferentially controls the first variable means rather than the second variable means. While using the rear discharge mode, the control means controls, the opening angle of the front discharge door to open and close the front discharge outlet or the opening angle of the rear discharge door to open and close the rear discharge outlet in synchronization with the front discharge modes.

According to a further aspect of the invention, an automatic air conditioning system for automotive vehicles having at least one front discharge outlet to discharge conditioned air to an occupant of the front seat in the vehicular cabin and at least one rear discharge outlet to discharge conditioned air to an occupant of the rear seat in the vehicular cabin comprises sensor means for monitoring the environmental condition of the vehicular cabin for producing a sensor signal indicative thereof, variable means associated with the first and second discharge outlets for varying the discharge mode of the conditioned air discharged therefrom, the variable means being operable in a first discharge mode wherein the conditioned air is concentratedly discharged to the occupant of the front seat in the vehicular cabin, a second discharge mode wherein the conditioned air is alternately discharged from the front and second discharge outlets in a manner so as to be diffused to all regions of the vehicular cabin, and a third discharge mode wherein the conditioned air is oscillatingly and alternately discharged from the front and rear discharge outlets to all regions of the vehicular cabin, shutter means for switching such that the conditioned air is alternately discharged from the front and rear discharge outlets, and discharge control means deriving a control value indicative of a heat demand on the basis of the sensor signal and a target temperature in the vehicular cabin. The discharge control means operating the variable means at the first discharge mode when the control value is within the range of a first predetermined values satisfying a first environmental condition, at the second discharge mode when the control value is within the range of a second predetermined values satisfying a second environmental condition, and at the third discharge mode when the control value is within the range of a third predetermined values satisfying a third environmental condition. The discharge control means controls the opening angle of the air mix door of the air conditioning system such that the air mix door is positioned in a full cool position wherein flowing air is prevented from passing through the heater core of the air conditioning system in synchronization with the second discharge mode.

According to a still further aspect of the invention, an automatic air conditioning system for automotive vehicles having at least one discharge outlet to discharge conditioned air therethrough comprises sensor means for monitoring the environmental condition of the vehicular cabin for producing a sensor signal indicative thereof, variable means associated with the discharge outlet for varying the discharge mode of the conditioned air discharged therefrom, the variable means being operable in a first discharge mode wherein the conditioned air is concentratedly discharged to an occupant of the vehicular cabin, a second discharge mode wherein the conditioned air is discharged in a manner so as to be diffused to all regions within the vehicular cabin, and a third discharge mode wherein the conditioned air is oscillatingly discharged to the occupant, blower means for changing the amount of the conditioned air to be discharged from the discharge outlet such that the blower means is operable at a first bower speed during the first discharge mode, a second blower speed less than the first blower speed during the second discharge mode, and a third blower speed combining the second blower speed and a blower speed less than the second blower speed during the third discharge mode, and discharge control means deriving a control value indicative of a heat demand on the basis of the sensor signal and a target temperature in the vehicular cabin. The discharge control means operates the variable means and the blower means at the first discharge mode when the control value is within the range of a first predetermined values satisfying a first environmental condition, at the second discharge mode when the control value is within the range of a second predetermined values satisfying a second environmental condition, and at the third discharge mode when the control value is within the range of a third predetermined values satisfying a third environmental condition.

According to yet another aspect of the invention, an automatic air conditioning system for automotive vehicles having at least one front discharge outlet to discharge conditioned air to an occupant of the front seat in the vehicular cabin and at least one rear discharge outlet to discharge conditioned air to an occupant of the rear seat in the vehicular cabin comprises sensor means for monitoring the environmental condition of the vehicular cabin for producing a sensor signal indicative thereof, variable means associated with the first and second discharge outlets for varying the discharge mode of the conditioned air discharged therefrom, the variable means being operable in a first discharge mode wherein the conditioned air is concentratedly discharged to the occupant of the front seat in the vehicular cabin, a second discharge mode wherein the conditioned air is alternately discharged from the front and second discharge outlets in a manner so as to be diffused to all regions of the vehicular cabin, and a third discharge mode wherein the conditioned air is oscillatingly and alternately discharged from the front and rear discharge outlets to all regions of the vehicular cabin, blower means for changing the amount of the conditioned air to be discharged from the first or second discharge outlet, the blower means being operable at a first bower speed during the first discharge mode, a second blower speed less than the first blower speed during the second discharge mode, and a third blower speed less than the second blower speed during the third discharge mode, shutter means for switching such that the conditioned air is alternately discharged from the front and rear discharge outlets, and discharge control means deriving a control value indicative of a heat demand on the basis of the sensor signal and a target temperature in the vehicular cabin. The discharge control means operating the variable means at the first discharge mode when the control value is within the range of a first predetermined values satisfying a first environmental condition, at the second discharge mode when the control value is within the range of a second predetermined values satisfying a second environmental condition, and at the third discharge mode when the control value is within the range of a third predetermined values satisfying a third environmental condition.

DESCRIPTION OF THE PREFERRED EMBODIMENTS

Figure 2:
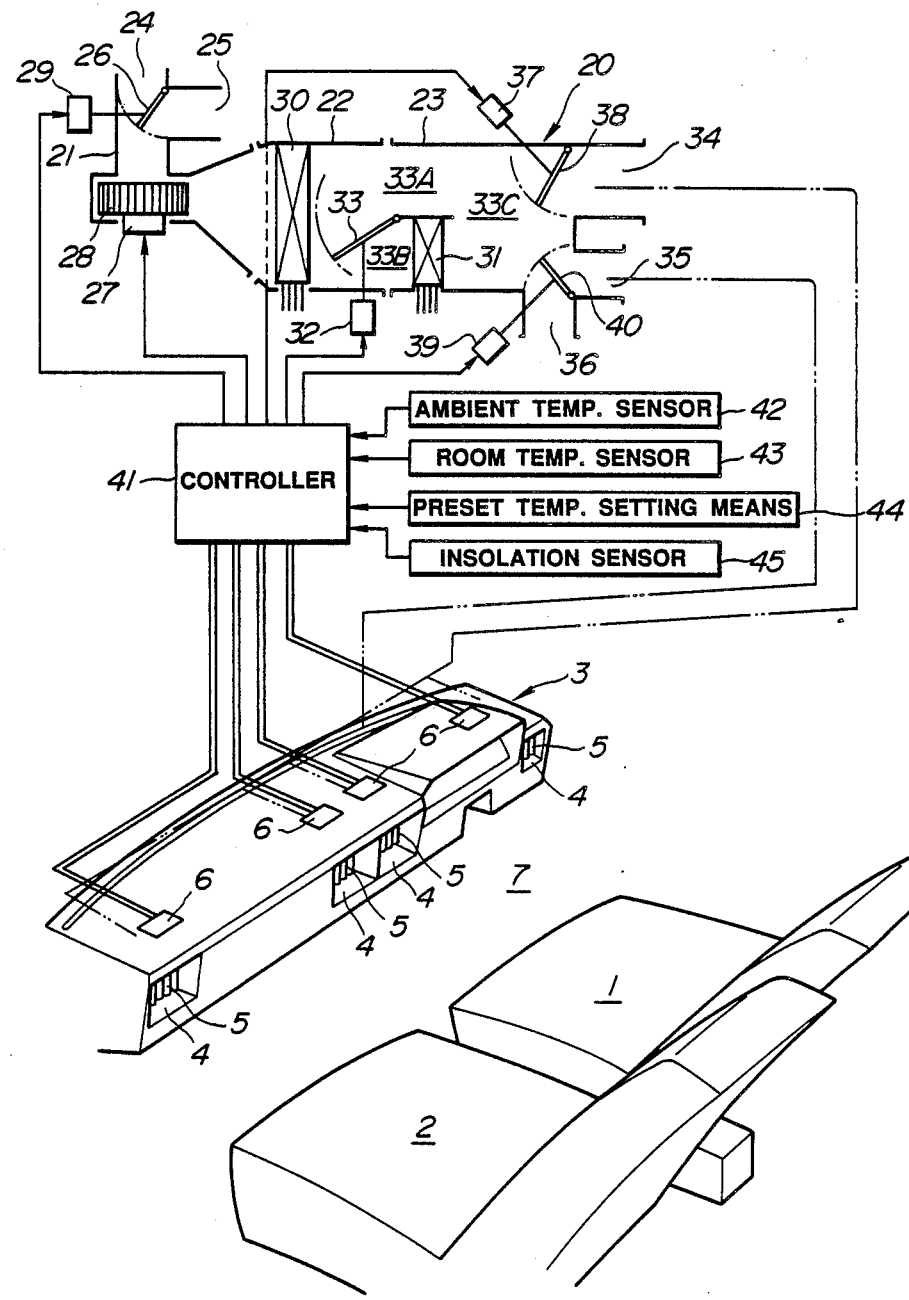
FIG. 2 is an explanatory view illustrating the air conditioning system according to the first embodiment.

Referring now to the drawings, particularly to FIG. 2, the main body 20 of an air conditioning system for an automotive vehicle is comprised of a blower unit 21, a cooling unit 22, and a heater unit 23. The blower unit 21 includes a switchable air intake door 26 for switching between a fresh air inlet 24 and a recirculated air inlet 25, and a blower 28 driven by a blower motor 27. The air intake door 26 is associated with an intake door actuator 29 for actuating it. The cooling unit 22 includes an evaporator 30 to cool air flowing therethrough. Additionally, a heater core 31 is provided in the heater unit 23. The heater core 31 utilizes cooling water from a vehicle engine as a heat source. An air mix door 33 is pivotably provided downstream of the evaporator 30 and upstream of the heater core 31 so as to vary the proportion of air passing through a first passageway 33A and a second passageway 33B. As clearly shown in FIG. 2, the air passing through the first passageway 33A is directly supplied to an air mix chamber 33C, while the air passing through the second passageway 33B is supplied to the air mix chamber 33C via the heater core 31. The air mix door 33 is associated with an air mix door actuator 32 for actuating it. Furthermore, the heater unit 23 includes a chest vent duct 34, a defroster vent duct 35, and a foot vent duct 36. A chest vent duct door 38 is pivotably provided at the base of the chest vent duct 34. A defroster/foot vent duct door 40 is pivotably provided at root of the defroster duct 35 and the foot vent duct 36. The chest vent duct door 38 and the defroster/foot vent duct door 40 are respectively associated with a chest vent duct door actuator 37 and a defroster/foot vent duct door actuator 39 to actuate these doors. The chest vent duct 34 is provided in an instrument panel 3 which is laterally mounted on the front wall of the vehicular cabin. The instrument panel 3 includes a plurality of discharge outlets 4 communicating with the chest vent duct 34. The discharge outlets 4 are directed at the chest level of occupants (not shown) taking front seats 1 and 2. As clearly shown in FIG. 2, there are a pair of center outlets and a pair of side outlets. Each of these discharge outlets 4 includes a louver 5 having a plurality of rotatable fins for changing the discharge direction of conditioned air. The plurality of fins for each louver 5 are rotated about their axes by means of an individual discharge outlet actuator 6 mounted in the instrument panel 3 as best seen in FIG. 2. In a preferred embodiment of an automatic air conditioning system according to the invention, the plurality of louvers 5 can be operated in three discharge modes by means of discharge outlet actuators 6 which are controlled by a controller 41 described below. In the first discharge mode, the plurality of fins for each louver 5 are collectively rotated about their axes and then the fins are arranged in predetermined positions such that conditioned air flowing through the fins of the louver 5 is forcibly directed to the occupants in the vehicular cabin. As a result, an essentially large amount of conditioned air flowing through the fins is concentratedly discharged relative to the occupants taking front seats 1 and 2. During the first discharge mode, the blower speed of the blower 28 is kept high. The first discharge mode is equal to the above mentioned "concentrated discharge mode". In the second discharge mode, the plurality of fins for each louver 5 are collectively rotated about their axes and then the respective surfaces of the plurality of fins are arranged in a sector fashion. As a result, the conditioned air flowing through the fins is discharged in a manner so as to be uniformly diffused to all regions within the vehicular cabin. During the second discharge mode, the blower speed is kept medium. The second discharge mode is substantially equal to the above mentioned "diffuse discharge mode", however, the second discharge mode is not executed after a cabin temperature become in acceptably close to the present temperature. In addition, the fins of the louvers 5 are operated in the third discharge mode which randomly or selectively combines the first discharge mode (concentrated discharge mode) and the second discharge mode (diffuse discharge mode) by means of the controller mentioned below. During the third discharge mode, the blower speed is selectively changed at a relatively short time period, for example 2 to 5 sec, in such a manner that the blower speed is medium when the louvers 5 are operated in the concentrated discharge mode, and the blower speed is low when the louvers 5 are operated in the diffuse discharge mode. The time period can be properly selected on the basis of timing of sweating of the occupants in the vehicular cabin. In actual, the time period is experimentally determined. In this manner, during the third discharge mode, the amount of conditioned air discharged from the discharge outlets 4 is randomly or selectively changed, thereby resulting in fluctuation of the conditioned air flow. As a result, the occupants in the vehicular cabin 7 can feel suitably cool as if natural wind is provided in the vehicular cabin. The third discharge mode will be hereinafter referred to as "random discharge mode". As set forth above, the plurality of fins of each louver 5 are directed in predetermined directions according to one of the three modes, namely the concentrated discharge mode, the diffuse discharge mode, and the random discharge mode.

The above-mentioned controller 41 comprises a microcomputer. The controller 41 is comprised of a discriminating means for determining the conditions of an enclosed environment such as a vehicular cabin 7 and a control means for controlling the environmental conditions in the vehicular cabin 7. As is well known, the controller includes an input circuit (not shown) for receiving various detection signals from various sensors, such as an ambient temperature sensor 42 for detecting ambient temperature $T_a$, a cabin temperature sensor (room temperature sensor) 43 for detecting temperature $T_{IC}$ in the vehicular cabin 7, and an insolation sensor 45 for detecting the magnitude S of insolation. The input circuit further receives the desired preset temperature $T_{SET}$ input by the occupant through a preset temperature setting means 44, such as a preset temperature setting switch provided on a control panel (not shown). The controller 41 also includes an output circuit (not shown) for outputting control signals to the actuators 6, 29, 32, 37, 39, and/or the blower motor 27.

Figure 1:
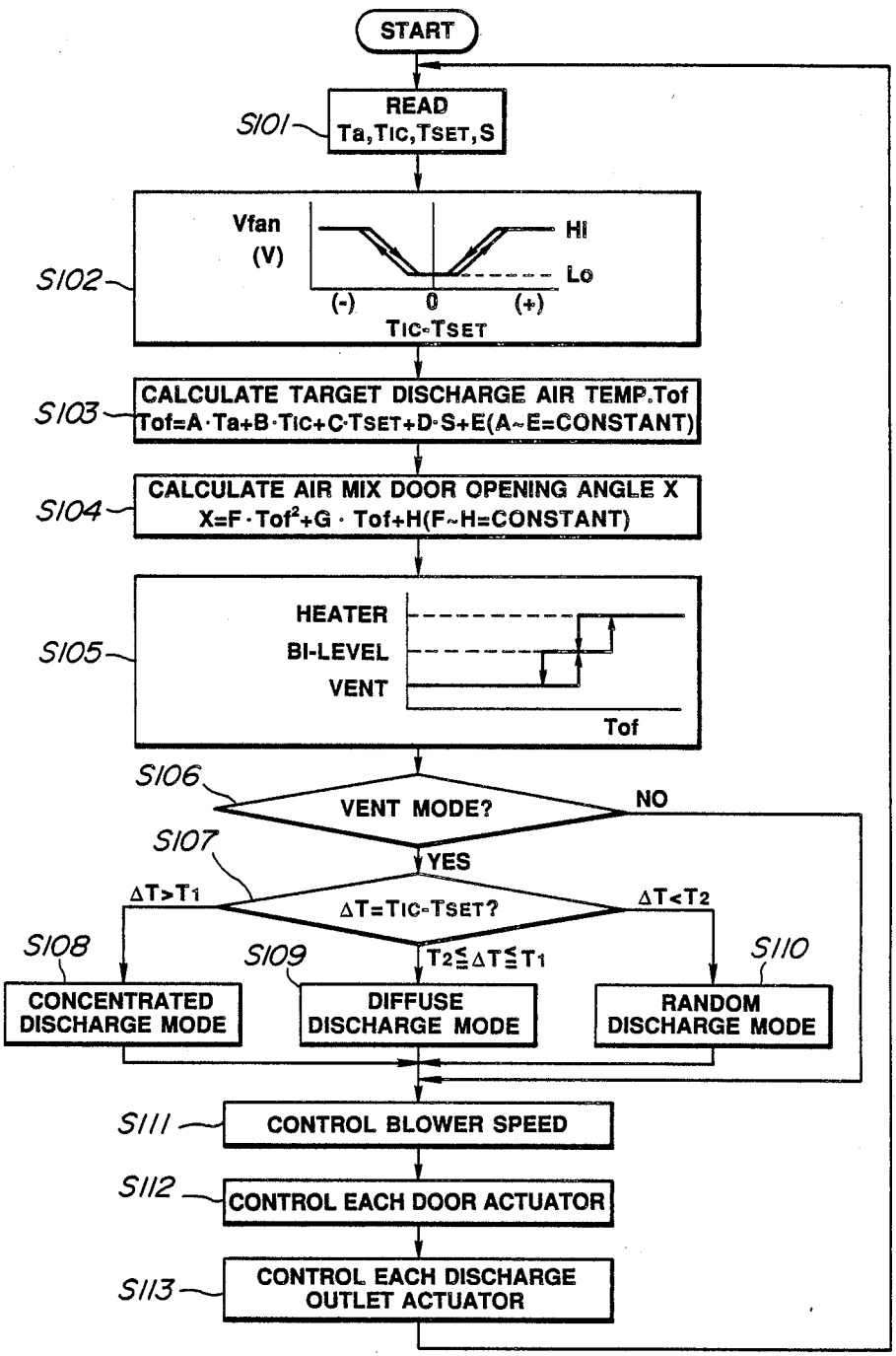
FIG. 1 is a flow chart representative of a program to control an air conditioning system of a first embodiment according to the invention, capable of executing three discharge modes in response to the environmental conditions in the vehicular cabin.

The controller 41 of the first embodiment of the air conditioning system according to the invention will be operated in accordance with the order of steps of the flow chart shown in FIG. 1.

In step S101, the automatic air conditioning system is automatically operated by the controller 41, when an air conditioning switch (not shown) is turned on. The controller 41 receives the information $T_a$, $T_{IC}$, $T_{SET}$, and S from the respective sensors, namely the ambient temperature sensor 42, the room temperature sensor 43, and the insolation sensor 45 and the preset temperature setting means 44.

In step S102, the value of an impressed voltage $V_{fan}$ to be applied to the blower motor 27 is determined on the basis of the difference ($T_{IC}-T_{SET}$) between the room temperature $T_{IC}$ and the preset temperature $T_{SET}$, thereby allowing the blower speed to be controlled.

In step S103, a target discharge air temperature $T_{of}$ is calculated according to the following equation.

$$T_{of} = A \cdot T_a + B \cdot T_{IC} + C \cdot T_{SET} + D \cdot S + E$$

wherein, the coefficients A to E are all constants. These values A to E are experimentally determined in consideration of particular vehicle sizes and/or shapes.

In step S104, an opening angle X of the air mix door 33 is calculated according to the following equation.

$$X = F \cdot T_{of}^2 + G \cdot T_{of} + H$$

wherein, the coefficients F to H are all constants, and the value of $T_{of}$ corresponds to the value of the target discharge air temperature $T_{of}$ calculated in step S103. These values F to H are experimentally determined in consideration of particular vehicle sizes and/or vehicle shapes as well.

In step S105, the controller selects either one of three discharge outlet modes, namely HEAT mode, BI-LEVEL mode, and VENT mode, in accordance with the target discharge air temperature $T_{of}$.

HEAT mode: The defroster duct 35 and the foot vent duct 36 are opened and the chest vent duct is closed.

BI-LEVEL mode: The chest vent duct 34 and the foot vent duct 36 are opened and the defroster duct is closed.

VENT mode: Only the chest vent duct 34 is opened.

Subsequently, step S106 proceeds to test whether the selected discharge outlet mode is the VENT mode. If the answer to step S106 is negative (no), at step S111 the impressed voltage $V_{fan}$ determined at step S102 is applied to the blower motor 27 so as to control the blower speed and then at step S112 the output circuit (not shown) of the controller 41 outputs control signals to the door actuators 37 and 39 for controlling the respective opening angles of the chest vent duct door 38 and the defroster/foot vent duct door 40 in response to either HEAT mode or BI-LEVEL mode. On the other hand, if the answer to step S106 is in the affirmative (yes), step S107 proceeds in which the difference $\Delta T$ between the room temperature $T_{IC}$ and the preset temperature $T_{SET}$ is compared with predetermined temperatures $T_1$ and $T_2$. If the difference $\Delta T(T_{IC}-T_{SET})$ exceeds the temperature $T_1$, that is, the room temperature is excessively higher than the preset target temperature, the discriminating means of the controller 41 determines that the environmental condition of the vehicular cabin 7 is in a cooling-down state wherein the cabin temperature $T_{IC}$ is excessively apart from the preset temperature $T_{SET}$, and then step S108 proceeds in which the louvers 5 are operated in the concentrated discharge mode wherein conditioned air is concentratedly discharged in the direction of front seats 1 and 2, thereby allowing the occupants taking the front seats to quickly feel cool. As clearly seen in the graph representative of the impressed voltage $V_{fan}$ determining the blower speed in step S102 of FIG. 1, in the cool-down state, the blower speed is high due to a relatively large difference between the cabin temperature $T_{IC}$ and the target temperature $T_{SET}$. If the difference $\Delta T$ is less than the temperature $T_2$, the discriminating means determines that the environmental condition of the vehicular cabin is in a steady state wherein the cabin temperature $T_{IC}$ is in acceptably close to the preset temperature $T_{SET}$ and then step S110 proceeds in which the louvers 5 are operated in the random discharge mode, thereby allowing the occupants taking the front seats to feel suitably cool and maintaining a comfortable vehicular cabin temperature. As seen in the impressed voltage graph of FIG. 1, in the steady state, the blower speed is normally low. However, during the random discharge mode, the blower speed is randomly or selectively changed at a relatively short time period, for example 2 to 5 sec, by the controller 41, that is, during the concentrated discharge mode the blower speed is medium, while during the diffuse discharge mode the blower speed is low. In this manner, during the random discharge mode, the medium blower speed and the low blower speed are repeated. As a result, the conditioned air like natural wind is provided in the vehicular cabin. If the difference $\Delta T$ is greater than or equal to the temperature $T_2$ but less than or equal to the temperature $T_1$, the discriminating means determines that the environmental condition of the vehicular cabin is in a transient state between the cooling-down state and the steady state, and then step S109 proceeds in which the louvers 5 are operated in the diffuse discharge mode, thereby preventing the occupants taking the front seats from feeling excessively cool. As seen in the impressed voltage graph of FIG. 1, in the transient state, the blower speed is kept at a first medium speed determined in a cycle of the routine of FIG. 1, and subsequently the blower speed is kept at a second medium speed determined in a next cycle of the routine of FIG. 1. The first medium speed become slightly less than the second medium speed due to the lowering of the difference between the cabin temperature $T_{IC}$ and the preset temperature $T_{SET}$. In this manner, the blower speed is gradually decreased from the cool-down state vicinity of the transient state to the steady state vicinity of the transient state.

As set forth above, in the transition of environmental conditions from the cooling-down state to the steady state, the controller 41 controls the discharge mode depending on the environmental conditions in the vehicular cabin which vary momentarily according to the lowering of the cabin temperature $T_{IC}$ and the discharge air temperature. This permits the occupants in the vehicular cabin to feel comfortable in accordance with the environmental state within the vehicular cabin.

Subsequently, in step S111, the blower speed is controlled in accordance with the impressed voltage determined in step S102 and then in step S112, the door actuators 37 and 39 are controlled so as to establish the predetermined opening angles thereof.

In step S113, the output circuit of the controller 41 outputs a drive signal to the discharge outlet actuators 6 for switching the discharge mode of the louvers 5. In this manner, the discharge mode is selected from among the concentrated discharge mode, the diffuse discharge mode, or the random discharge mode.

Figure 3:
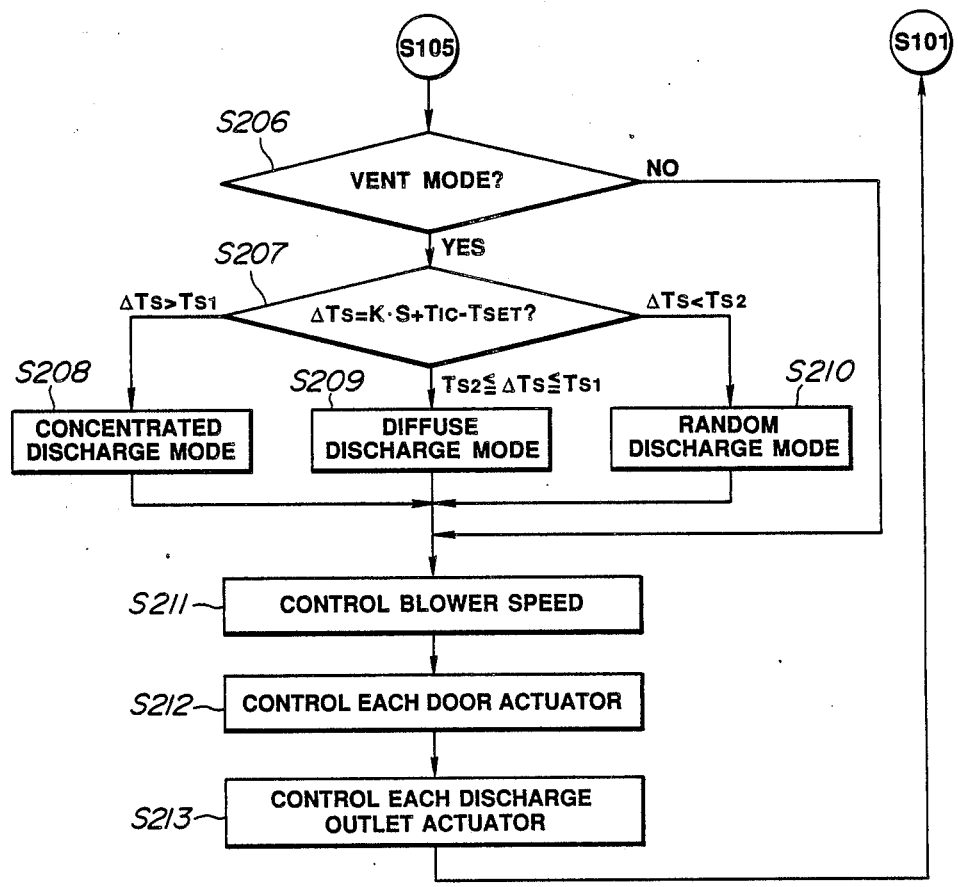
FIG. 3 is a flow chart representative of a program to control an air conditioning system of a second embodiment according to the invention.

FIG. 3 is a flow chart illustrating the second embodiment of an air conditioning system according to the invention. As shown in FIG. 3, the second embodiment is different from the first embodiment in that the discriminating means of the controller 41 determines the condition of the environment in the vehicular cabin 7 on the basis of the sum $\Delta T_S$ $(K.S + T_{IC} - T_{SET})$ between the above mentioned difference $(T_{IC}-T_{SET})$ and a converted value $K.S$ derived by converting the insolation magnitude to a temperature value. That is to say, the steps S101 to S105 in the second embodiment are similar to the first embodiment, however at step S206 next to step S105 a test is made to determine whether the discharge outlet mode is the VENT mode. If the answer to step S206 is affirmative (yes), step S207 proceeds in which the sum $\Delta T_S$ between the difference $(T_{IC}-T_{SET})$ and the converted value $K.S$ is compared with predetermined temperatures $T_{S1}$ and $T_{S2}$. If the sum $\Delta T_S$ exceeds the temperature $T_{S1}$, the discriminating means of the controller 41 determines that the environmental condition of the vehicular cabin 7 is in a cooling-down state, and then step S208 proceeds in which the louvers 5 are operated in the concentrated discharge mode. If the sum $\Delta T_S$ is less than the temperature $T_{S2}$, the discriminating means determines that the environmental condition of the vehicular cabin is in a steady state, and then step S210 proceeds in which the louvers 5 are operated in the random discharge mode. If the sum $\Delta T_S$ is greater than or equal to the temperature $T_{S2}$ but less than or equal to the temperature $T_{S1}$, the discriminating means determines that the environmental condition of the vehicular cabin is in a transient state between the cooling-down state and the steady state, and then step S209 proceeds in which the louvers 5 are operated in the diffuse discharge mode. Since in this second embodiment, the conditions of the environment in the vehicular cabin 7 are determined by the magnitude S of insolation as well as the difference of temperature between the cabin temperature $T_{IC}$ and the preset temperature $T_{SET}$, the controller 41 according to the second embodiment can discriminate the conditions of the environment in the vehicular cabin 7 more precisely than in the first embodiment, thereby allowing highly precise control of the discharge modes in closer relation to the actual response of the occupants to the environmental conditions in the vehicular cabin 7.

Figure 4:
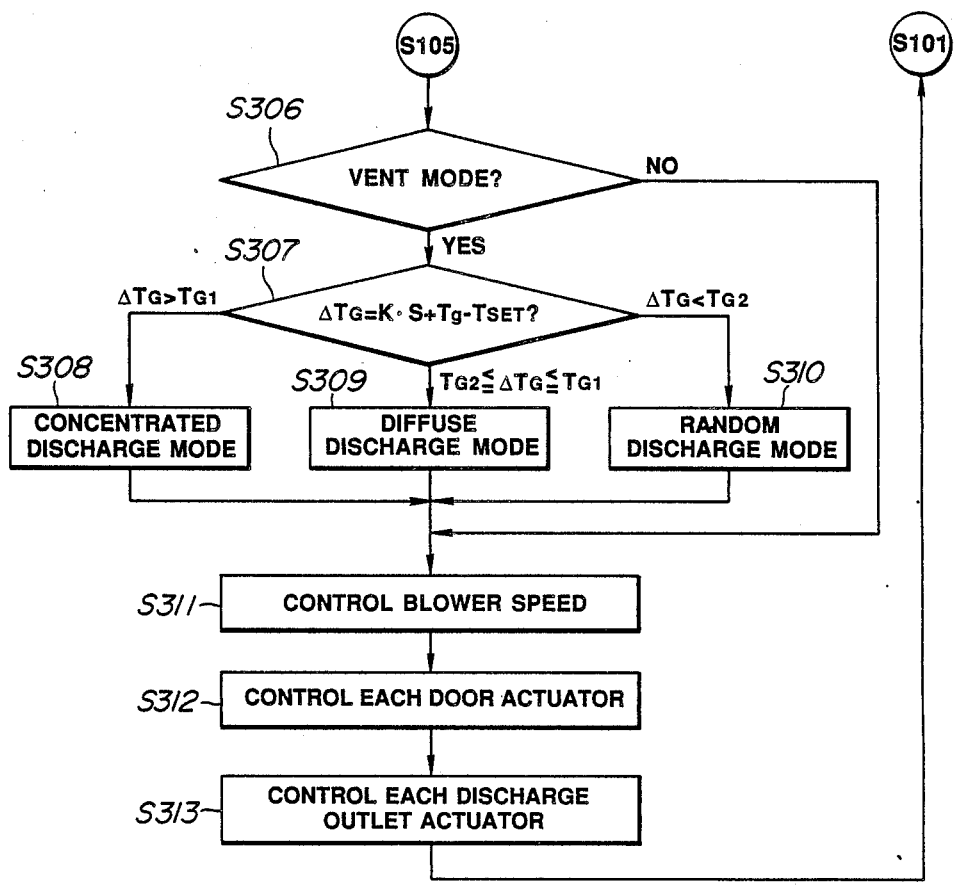
FIG. 4 is a flow chart representative of a program to control an air conditioning system of a third embodiment according to the invention.

FIG. 4 is a flow chart illustrating the third embodiment of an air conditioning system according to the invention. As shown in FIG. 4, the third embodiment is different from the first and second embodiments in that the discriminating means of the controller 41 discriminates the conditions of the environment in the vehicular cabin 7 by utilizing the magnitude S of insolation, radiation temperature $T_g$ in the vehicular cabin 7, and the preset temperature $t_{SET}$. In other words, the steps S101 to S105 in the third embodiment are similar to first embodiment, however at step S306 after step S105 a test is made to determine whether the discharge outlet mode is the VENT mode. If the answer to step S306 is affirmative (yes), step S307 proceeds in which the value $\Delta T_G$ corresponding to $(K.S + T_g - T_{SET})$ is compared with predetermined temperatures $T_{G1}$ and $T_{G2}$. If the value $\Delta T_G$ exceeds the temperature $T_{G1}$, the discriminating means of the controller 41 determines that the environmental condition of the vehicular cabin 7 is in a cooling-down state, and then step S308 proceeds in which the louvers 5 are operated in the concentrated discharge mode. If the value $\Delta T_G$ is less than the temperature $T_{G2}$, the discriminating means determines that the environmental condition of the vehicular cabin 7 is a steady state, and then step S310 proceeds in which the louvers 5 are operated in the random discharge mode. If the value $\Delta T_G$ is less than or equal to the temperature $T_{G1}$, the discriminating means determines that the environmental condition of the vehicular cabin 7 is in a transient state between the cooling-down state and the steady state, and then step S309 proceeds in which the louvers 5 are operated in the diffuse discharge mode. Since in this third embodiment, the conditions of the environment in the vehicular cabin 7 are determined by the radiation temperature $T_g$ as well as the magnitude S of insolation and the preset temperature $T_{SET}$, the controller 41 according to the third embodiment can more accurately discriminate the conditions of the environment in the vehicular cabin 7 in consideration of the radiant heat, which has a great influence on the comfort of the occupants, thereby allowing highly precise control of the discharge modes in consideration of the radiant heat in the vehicular cabin 7. The radiation temperature $T_g$ is detected by a black bulb thermometer (not shown) from which the temperature $T_g$ is input to the input circuit (not shown) of the controller 41.

Figure 5:
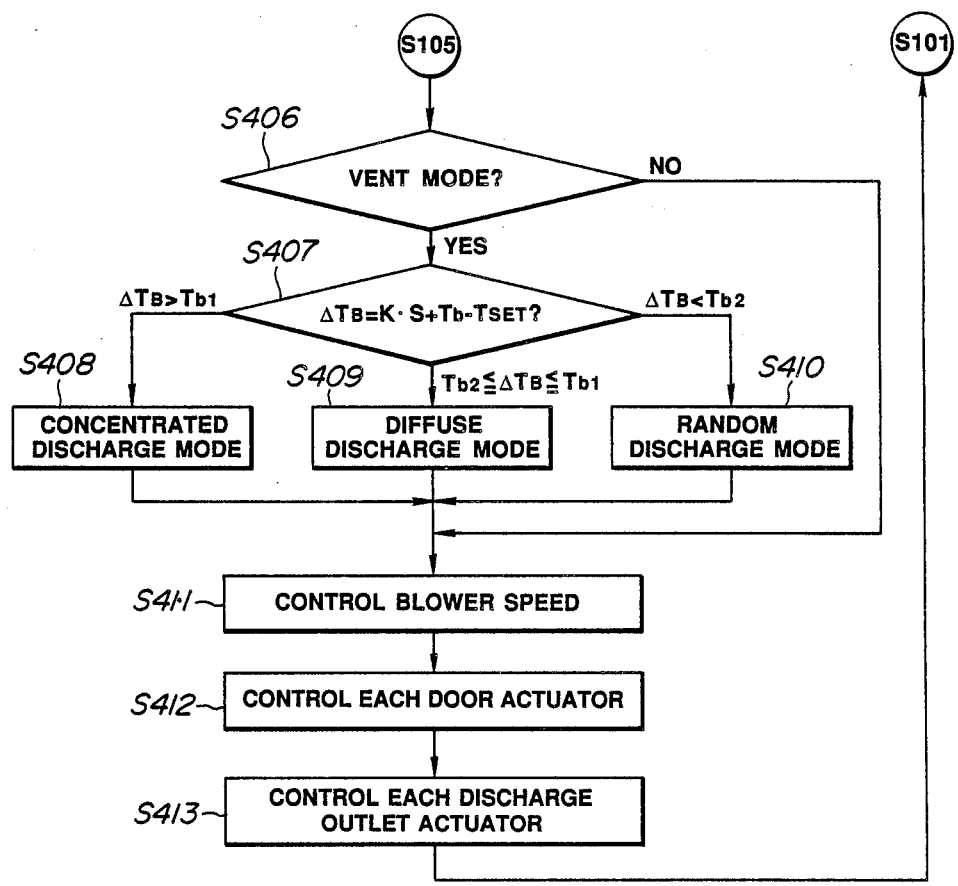
FIG. 5 is a flow chart representative of a program to control an air conditioning system of a fourth embodiment according to the invention.

FIG. 5 is a flow chart illustrating the fourth embodiment of an air conditioning system according to the invention. As shown in FIG. 5, the fourth embodiment is different from the first, second, and third embodiments in that the discriminating means of the controller 41 determines the conditions of the environment in the vehicular cabin 7 by utilizing the magnitude S of insolation, the preset temperature $T_{SET}$, and a surface temperature $T_b$, for example the temperature of the skin surface of an occupant or the temperature of the surface of an occupants clothing. On the other hand, steps S101 to S105 in the fourth embodiment are the same as in the first embodiment, however at step S406 after step S105 a test is made as to whether the discharge outlet mode is the VENT mode. If the answer to step S406 is affirmative (yes), step S407 proceeds in which the value $\Delta T_B$ corresponding to $(K.S + T_b - T_{SET})$ is compared with predetermined temperatures $T_{b1}$ and $T_{b2}$. If the value $\Delta T_B$ exceeds the temperature $T_{b1}$, the discriminating means of the controller 41 determines that the environmental condition of the vehicular cabin 7 is in a cooling-down state, and then step S408 proceeds in which the louvers 5 are operated in the concentrated discharge mode. If the value $\Delta T_B$ is less than the temperature $T_{b2}$, the discriminating means determines that the environmental condition of the vehicular cabin is a steady state, and then step S410 proceeds in which the louvers 5 are operated in the random discharge mode. If the value $\Delta T_B$ is greater than or equal to the temperature $T_{b2}$ and the value $\Delta T_B$ is less than or equal to the temperature $T_{b1}$, the discriminating means determines that the environmental condition of the vehicular cabin is in a transient state between the cooling-down state and the steady state, and then step S409 proceeds in which the louvers 5 are operated in the diffuse discharge mode. Since in this fourth embodiment, the conditions of the environment in the vehicular cabin 7 are determined by the surface temperature $T_b$ as well as the magnitude S of insolation and the preset temperature $T_{SET}$, the controller 41 according to the fourth embodiment can discriminate the conditions of the environment in the vehicular cabin 7 in consideration of surface temperature, which has an great influence on comfort of the occupants, thereby allowing highly precise control of the discharge mode in consideration of the skin surface temperature of the vehicle occupants or the surface temperature of clothes worn by the vehicle occupants. The surface temperature $T_b$ is detected by a thermometer (not shown) built into the front seat or a temperature probe (not shown) arranged on the skin surface of the occupant from which the temperature $T_b$ is input to the may be input circuit (not shown) of the controller 41.

On the other hand, since steps S211 to S213, S311 to S313, and S411 to S413 in FIGS. 3, 4, and 5 correspond to step S111 to S113 in FIG. 1, these descriptions are omitted for the purpose of simplification of the disclosure.

Although in the first, second, third, and fourth embodiments, the output circuit of the controller 41 outputs control signals to the discharge outlet actuators 6 such that, during a transient state of the vehicular cabin environment, the louvers 5 are operated in the diffuse discharge mode, the louvers 5 may also be operated in the concentrated discharge mode with relatively low blower speed, thereby preventing the occupants from cooling excessively.

Although in the above mentioned embodiments, the impressed voltage $V_{fan}$ is determined by the difference between the room temperature $T_{IC}$ and the preset temperature $T_{SET}$, increase and/or decrease in the impressed voltage $V_{fan}$ may be suitably combined with the random discharge mode of the louvers 5 during the steady discharge mode.

Although in the above mentioned embodiments, the louvers 5 are operated in the random discharge mode during a steady state, the concentrated discharge mode and the diffuse discharge mode may be alternately and cyclically performed. During a steady state, the louvers 5 may be operated in a swing discharge mode wherein the fins of the louvers 5 are oscillated in such a manner that the discharge direction of conditioned air from the louvers 5 is varied laterally with respect to the interior of the vehicular cabin. Furthermore, during a steady state, these controls may be suitably combined.

In the above mentioned embodiments, the room temperature $T_{IC}$, the preset temperature $T_{SET}$, the converted value K.S of the temperature relative to the magnitude S of insolation, radiation temperature $T_g$, and surface temperature $T_b$ are utilized as control parameters for determining the conditions of the environment in the vehicular cabin. Preferably, these control parameters may be suitably combined with the result that the discriminating means of the controller 41 can determine the condition of the enviroment in the vehicular cabin more precisely.

Figure 6:
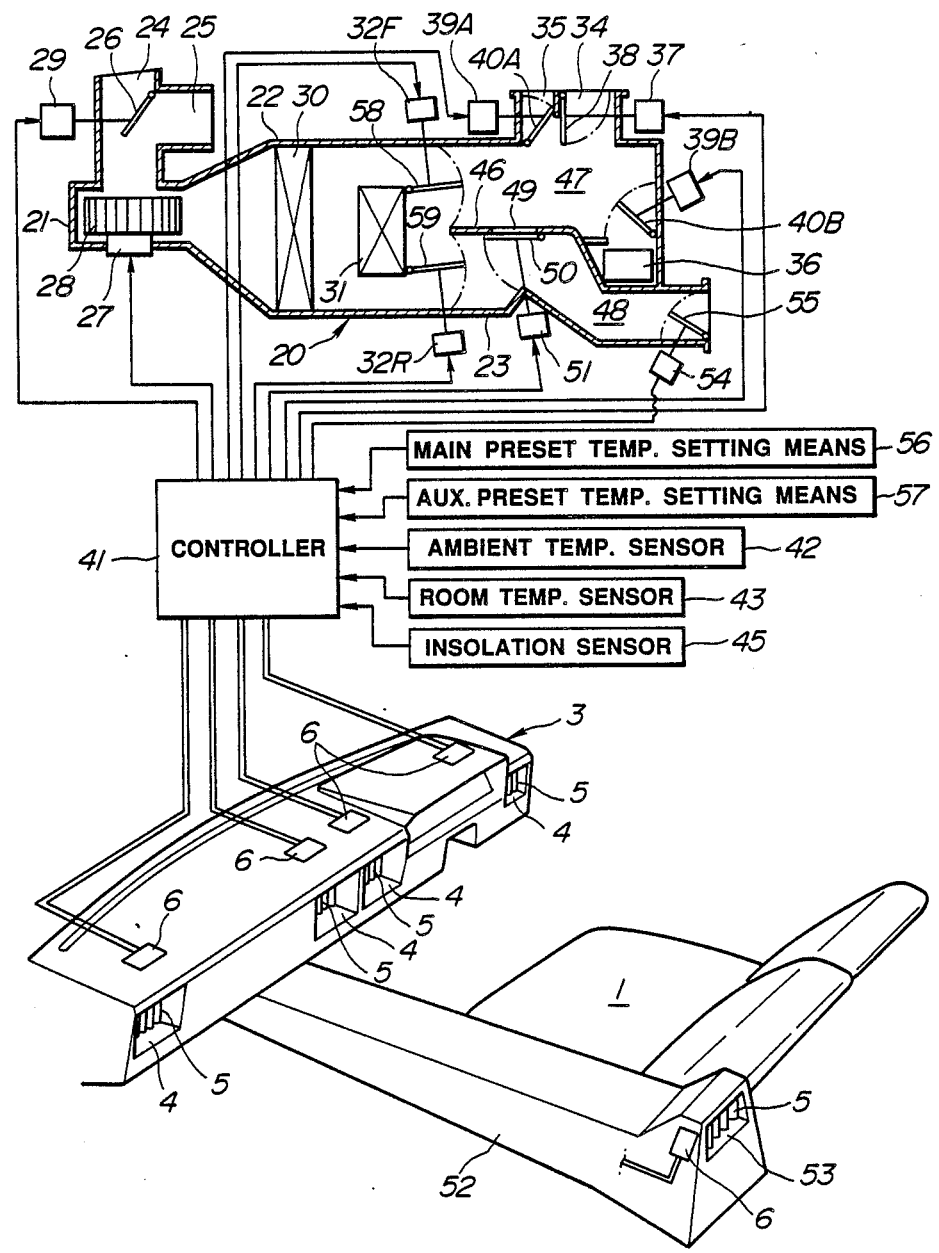
FIG. 6 is an explanatory view illustrating an air conditioning system with both of front and rear discharge outlets of a fifth embodiment according to the invention.

FIG. 6 shows the fifth embodiment of an air conditioning system according to the invention. The same reference numerals used in the first embodiment shown in FIG. 2 will be applied to corresponding elements in the fifth embodiment shown in FIG. 6 for the purpose of comparison between the first and fifth embodiments.

As shown in FIG. 6, the fifth embodiment is different from the first embodiment in that, within the heater unit 23 of the air conditioning system, the air mix chamber is comprised of a front air mix chamber 47 and a rear air mix chamber 48 separated by means of a partition wall 46 having a communicating opening 49. A front air mix door 58 and rear air mix door 59 are provided in the front and rear air mix chambers 47 and 48, respectively. A switchable door 50 is pivotably provided in the partition wall 46 by which the communicating opening 49 is opened and closed to control the proportion of air flowing through front and rear air mix doors 58 and 59 into the front and rear air mix chambers 47 and 48. The switchable door 49 is actuated by a switchable door actuator 51. In this fifth embodiment, the blower unit 21 and the cooling unit 22 are similar to the first embodiment. In the front air mix door side of the heater unit 23, the chest vent duct 34, defroster duct 35, and the foot vent duct 36 are provided with substantially the same construction as shown in the first embodiment. On the other hand, in the fifth embodiment, a rear discharge outlet door 55 is pivotably provided downstream of the rear air mix chamber 48 for controlling the amount of air flowing through a rear discharge outlet 53 which is provided at the rear end of a center console 52 and is communicated with the rear air mix chamber 48 through a rear connecting duct (not shown) formed in the center console 52. The rear discharge outlet door 55 is actuated by a rear discharge door actuator 54. A louver 5 and a discharge outlet actuator 6 are provided to the rear discharge outlet 53 as well.

The controller 41 of the fifth embodiment receives signals from various sensors, such as an ambient temperature sensor 42, a room temperature sensor 43, and an insolation sensor 45 through an input circuit (not shown) thereof. The input circuit further receives the desired main preset temperature $T_{SETF}$ input by a vehicle occupant through a main preset temperature setting means 56, such as a front preset temperature setting switch (not shown) provided on a control panel (not shown) mounted on the instrument panel 3 and the desired auxiliary preset temperature $T_{SETR}$ input by the occupant through an auxiliary preset temperature setting means 57, such as a rear preset temperature setting switch (not shown) provided, for example on a rear surface of a back rest of a front seat or on a rear surface of the center console 52. Additionally, the controller 41 includes an output circuit (not shown) for outputting control signals to the actuators 6, 29, 32F, 32R, 37, 39, 39A, 51, 54 and/or the blower motor 27. In this construction, the actuator 32R for actuating the rear air mix door 59, the switchable door actuator 51 for actuating the switchable door 50, and the rear discharge outlet door actuator 55 are newly added in comparison with the first embodiment. In addition, the defroster/foot vent duct door actuator 40 is separated into a defroster door actuator 40A and a foot vent duct door actuator 40B because the respective root portions of the defroster duct 35 and the foot vent duct 36 are arranged separately from each other.

Figure 7:
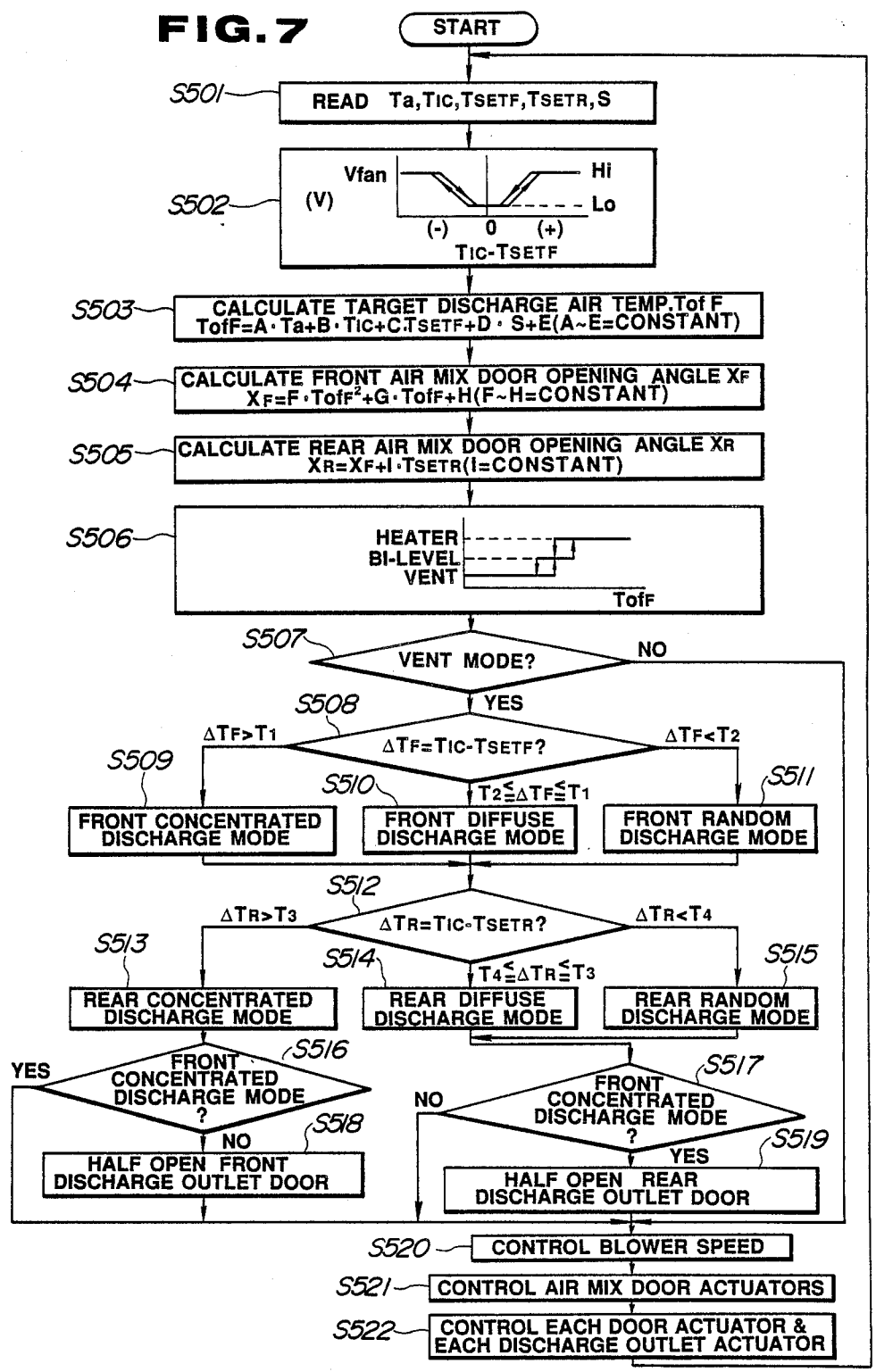
FIG. 7 is a flow chart representative of a program to control the air conditioning system according to the fifth embodiment.

The controller 41 of the fifth embodiment of an air conditioning system according to the invention will be operated in accordance with the order of steps of the flow chart shown in FIG. 7.

In step S501, the automatic air conditioning system is automatically operated by the controller 41, when an air conditioning switch (not shown) is turned on. The controller 41 receives the information $T_a$, $T_{IC}$, S, $T_{SETF}$, and $T_{SETR}$ from the ambient temperature sensor 42, the room temperatue sensor 43, the insolation sensor 45, the main preset temperature setting means 56, and the auxiliary preset temperature setting means 57.

In step S502, the value of an impressed voltage $V_{fan}$ to be applied to the blower motor 27 is determined on the basis of the difference between the room temperature $T_{IC}$ and the main preset temperature $T_{SETF}$, thereby allowing the blower speed to be controlled appropriately.

In step S503, a target discharge air temperature $T_{ofF}$ is calculated according to the following equation.

$$T_{ofF} = A \cdot T_a + B \cdot T_{IC} + C \cdot T_{SETF} + D \cdot S + E$$

wherein, the coefficients A to E are all constants. These values A to E are experimentally determined in consideration of various vehicle sizes and/or shapes.

In steps S504 and S505, an opening angle $X_F$ of the front air mix door 58 and an opening angle $X_R$ of the rear air mix door 59 are respectively calculated according to the following equations.

$$X_F = F \cdot T_{ofF}^2 + G \cdot T_{ofF} + H$$

$$X_R = X_F + I \cdot T_{SETR}$$

wherein, the coefficients F to H are all constants, and the value of $T_{ofF}$ corresponds to the value of the target discharge air temperature $T_{ofF}$ calculated in step S503. These values, F to H are also experimentally determined in consideration of vehicle sizes and/or shapes.

In step S506, the controller selects one of three discharge outlet modes, namely HEAT mode, BI-LEVEL mode, and VENT mode, in accordance with the target discharge air temperature $T_{ofF}$.

After this, step S507 proceeds to test whether the selected discharge outlet mode is the VENT mode. If the answer to step S507 is negative (no), the impressed voltage $V_{fan}$ determined at step S502 is applied to the blower motor 27 so as to control the blower speed at step S520 and further at step S521 the output circuit (not shown) of the controller 41 outputs control signals to both air mix door actuators 32 and 32R for controlling the respective opening angles of the front and rear air mix doors 58 and 59. Moreover, in step S522, the output circuit outputs control signals to door actuators 37, 39A, 39B, 51, 54, and the discharge outlet actuators 6. On the other hand, if the answer to step S507 is affirmative (yes), step S508 proceeds in which the difference $\Delta T_F$ between the room temperature $T_{IC}$ and the main preset temperature $T_{SETF}$ is compared with predetermined temperatures $T_1$ and $T_2$. If the difference $\Delta T_F(T_{IC} - T_{SETF})$ exceeds the temperature $T_1$, the discriminating means of the controller 41 determines that the environmental condition of the vehicular cabin 7 is in a cooling-down state, and then step S509 proceeds in which the louvers are operated in the front concentrated discharge mode wherein the conditioned air is concentratedly discharged in the direction of the front seats, thereby allowing the occupants taking the front seats to quickly feel cool. If the difference $\Delta T_F$ is less than temperature T$_2$, the discriminating means determines that the environmental condition of the vehicular cabin 7 is a steady state, and then step S511 proceeds in which the louvers 5 are operated in the random discharge mode, thereby allowing the occupants taking the front seats to feel suitably cool and maintaining a comfortable temperature within the vehicular cabin 7. If the difference $\Delta T_F$ is greater than or equal to the temperature T$_2$ but less than or equal to the temperature T$_1$, the discriminating means determines that the environmental condition of the vehicular cabin is in a transient state between the cooling-down state and the steady state, and then step S510 proceeds in which the louvers 5 are operated in the diffuse discharge mode, thereby preventing the occupants taking the front seats from cooling excessively or preventing the occupants of the front seats from feeling excessive cool.

Subsequently, in step S512, the difference $\Delta T_R$ between the room temperature T$_{IC}$ and the auxiliary preset temperature T$_{SETR}$ is compared with predetermined temperatures T$_3$ and T$_4$. If the difference $\Delta T_R$ (T$_{IC}$−T$_{SETR}$) exceeds the temperature T$_3$, the discriminating means of the controller 41 determines that the environmental condition of the vehicular cabin 7 is in a cool-down state, and then step S513 proceeds in which the louver 5 of the rear discharge outlet 53 is operated in the rear concentrated discharge mode wherein the conditioned air is concentratedly discharged through the rear discharge outlet 53 in the direction of the rear seats, thereby allowing the occupants taking the rear seats to quickly feel cool. If the difference $\Delta T_R$ is less than the temperature T$_4$, the discriminating means determines that the environmental condition of the vehicular cabin 7 is a steady state, and then step S515 proceeds in which the louver 5 of the rear discharge outlet 53 is operated in the random discharge mode, thereby allowing the occupants taking the rear seats to feel suitably cool and maintaining a comforable vehicular cabin temperature. If the difference $\Delta T_R$ is greater than or equal to T$_4$ and the difference $\Delta T_R$ is less than or equal to the temperature T$_3$, the discriminating means determines that the environmental condition of the vehicular cabin is a transient state between the cooling-down state and the steady state, and then step S514 proceeds in which the louver 5 of the rear discharge outlet 53 is operated in the diffuse discharge mode, thereby preventing the occupants taking the rear seats from cooling excessively or preventing the occupants of the rear seats from feeling excessive cool.

If the louver 5 of the rear discharge outlet 53 is operated in the rear concentrated discharge mode, step S516 proceeds in which a test is made to determine whether the louvers 5 of the front discharge outlets 4 are operating in the front concentrated discharge mode. If the answer to step S516 is negative (no), that is, in a discharge mode other than the front concentrated discharge mode, step S518 proceeds in which the open chest vent door 38 is half closed, thereby causing a relatively large amount of air to be diverted to the rear discharge outlet 53 via the rear air mix chamber 48. This results in a sufficient amount of air being discharged from the rear discharge outlet 53, during the rear concentrated discharge mode. If the answer to step S516 is affirmative (yes), that is, the front concentrated discharge mode is engaged, the routine moves to steps S520, S521, and S522, in that order.

Conversely, if the louver 5 of the rear discharge outlet 53 is operated in either the diffuse discharge mode or the random discharge mode, step S517 proceeds in which a test is made to determine whether the louvers 5 of the front discharge outlets 4 are operating in the front concentrated discharge mode. If the answer to step S517 is affirmative (yes), step S519 proceeds in which the open rear discharge outlet door 55 is half closed, thereby causing a relatively large amount of air to be discharged from the front discharge outlets 4 via the front air mix chamber 47. This results in a sufficient amount of air discharge from the front discharge outlets 4, during the front concentrated discharge mode. If the answer to step S517 is negative (no), the routine moves to steps S520, S521, and S522 in that order.

Although in steps S518 and S519, the chest vent duct door 38 and the rear discharge outlet door 55 are controlled so as to be half opened, the controller 41 may control door actuators 37 and 54 in a manner so as to finely adjust the opening angles of the doors 38 and 55 with the result that the proportion of conditioned air between the front and rear air mix chambers 47 and 48 is precisely controlled in response to each discharge mode.

FIGS. 8 to 11 show the sixth embodiment of an air conditioning system according to the invention. The same reference numerals used in the first embodiment shown in FIG. 2 will be applied to the corresponding elements used in the sixth embodiment shown in FIGS. 8 and 9 for the purpose of comparison between the first and sixth embodiments.

Figure 8:
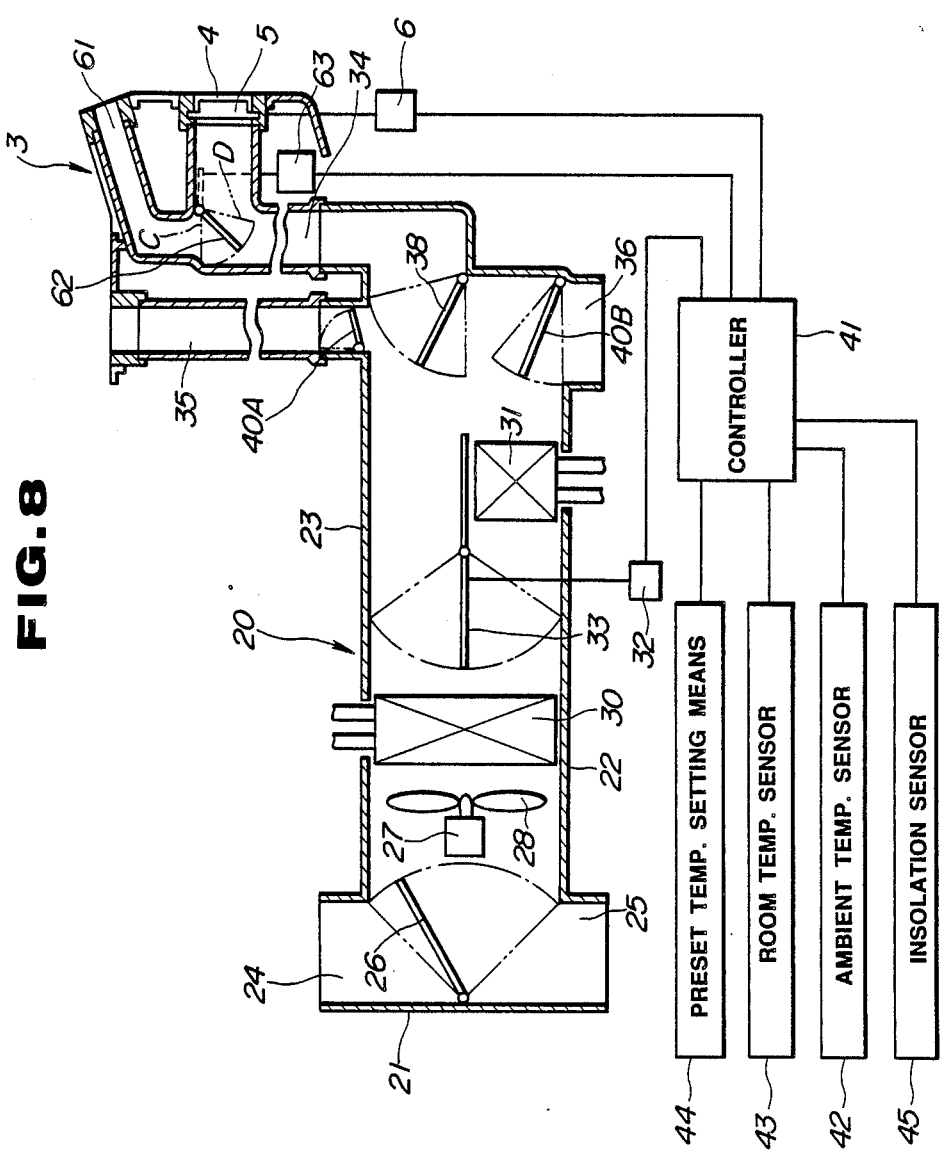
FIG. 8 is an explanatory view illustrating an air conditioning system with a rear discharge outlet provided in an upper portion of the front instrument panel of the vehicle according to a sixth embodiment of the invention.
Figure 9:
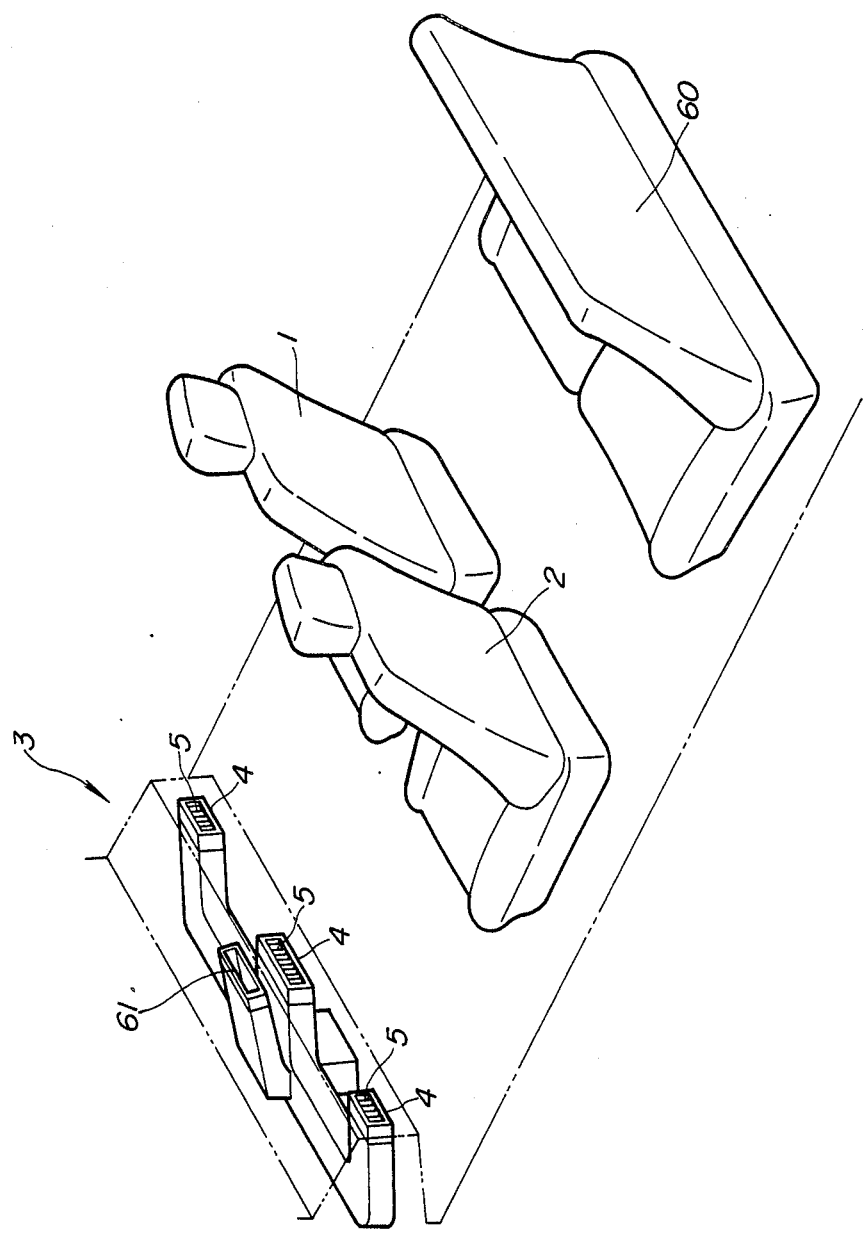
FIG. 9 is a perspective view illustrating the arrangement of the front and rear discharge outlets in the vehicular cabin for the air conditioning system according to the sixth embodiment.

As shown in FIGS. 8 and 9, the sixth embodiment is different from the other embodiments in that a rear discharge outlet 61 is provided on the upper portion of the front instrument panel 3.

Referring to FIGS. 8 and 9, a heater unit 23 includes a chest vent duct 34, a defroster duct 35, and a foot vent duct 36 at a root portion of each being, respectively, a chest vent duct door 38, a defroster duct door 58 and a foot vent duct door 59 are pivotably provided. Although it is not shown in FIG. 8 for the purpose of simplication of the disclosure, the chest vent duct door 38, the defroster duct door 58 and the foot vent duct door 59 are associated with the respective door actuators. The chest vent duct 34 is provided in an instrument panel 3 which is laterally mounted on the front wall of the vehicular cabin. The instrument panel 3 includes a plurality of discharge outlets 4 communicating with the chest vent duct 34. The discharge outlets 4 are directed at the chest level of the vehicle occupants (not shown) taking front seats 1 and 2 as shown in FIG. 9. As clearly shown in FIG. 9, the front discharge outlets 4 are generally comprised of a center vent and a pair of side vents. Each of the discharge outlets 4 includes a louver 5 having a plurality of rotatable fins for changing the discharge direction of conditioned air. The plurality of fins of each louver 5 are collectively rotated about their axes by means of a discharge outlet actuator 6 mounted in the instrument panel 3. The plurality of louvers 5 can be operated in three discharge modes by means of the discharge outlet actuators 6 which are controlled by a controller 41 described below. The first discharge mode is the above described front concentrated discharge mode. In the second discharge mode, the conditioned air is alternately discharged from the front discharge outlets 4 and the rear discharge outlet 61. Additionally, in the second front discharge mode wherein the conditioned air is discharged from the front discharge outlets 4 during the second discharge mode, the plurality of fins for each louver 5 of the front discharge outlets 4 are collectively rotated about their axes and then the respective surfaces of the plurality of fins are arranged in a sector fashion with the result that the conditioned air flowing through the fins of the front discharge outlets 4 is discharged from the front discharge outlets 4 in such a manner that cool air is mainly diffused to the front compartment of the vehicular cabin. On the other hand, in the second rear discharge mode wherein the conditioned air is discharged from the rear discharge outlet 61 during the second discharge mode, the conditioned air flowing through the rear discharge outlet 61 is discharged in a manner so as to be mainly diffused to the rear compartment of the vehicular cabin by the laterally rectangular shape of rear discharge outlet 61. The second discharge mode will be hereinafter referred to as "intermittent front and rear diffuse discharge mode". Furthermore, the discharge outlets 4 and 61 are further operated in a third discharge mode in which the conditioned air is alternately discharged from the front discharge outlets 4 and the rear discharge outlet 61. Additionally, in the third front discharge mode wherein the conditioned air is discharged from the front discharge outlets 4 during the third discharge mode, the plurality of fins for each louver 5 of the front discharge outlets 4 are sequentially rotated about their axes rightward and leftward with the result that the conditioned air flowing through the fins of the front discharge outlets 4 is discharged from the front discharge outlets 4 in such a manner that the discharge direction of conditioned air flowing through the fins of the front discharge outlets 4 is sequentially changed. On the other hand, in the third rear discharge mode wherein the conditioned air is discharged from the rear discharge outlet 61 during the third discharge mode, the conditioned air flowing through the rear discharge outlet 61 is discharged in a manner so as to be mainly diffused to the rear compartment of the vehicular cabin by the laterally rectangular shape of rear discharge outlet 61. The third discharge mode will be hereinafter referred to as, "intermittent front and rear swing discharge mode".

On the other hand, as best seen in FIG. 9, the automotive vehicle generally includes front seats 1, 2, and a rear seat 60. In the sixth embodiment of an air conditioning system according to the invention, the rear discharge outlet 61 is arranged on the upper portion of the front instrument panel 3 in such a manner that the conditioned air from the rear discharge outlet 61 can be discharged over the heads of the occupants of front seats 1 and 2 in the direction of the rear seat 60. As shown in FIG. 8, the front and rear discharge outlets 4 and 61 are alternately opened and closed by means of a vent shutter 62 associated with a vent shutter actuator 63 for actuating it.

Figure 10:
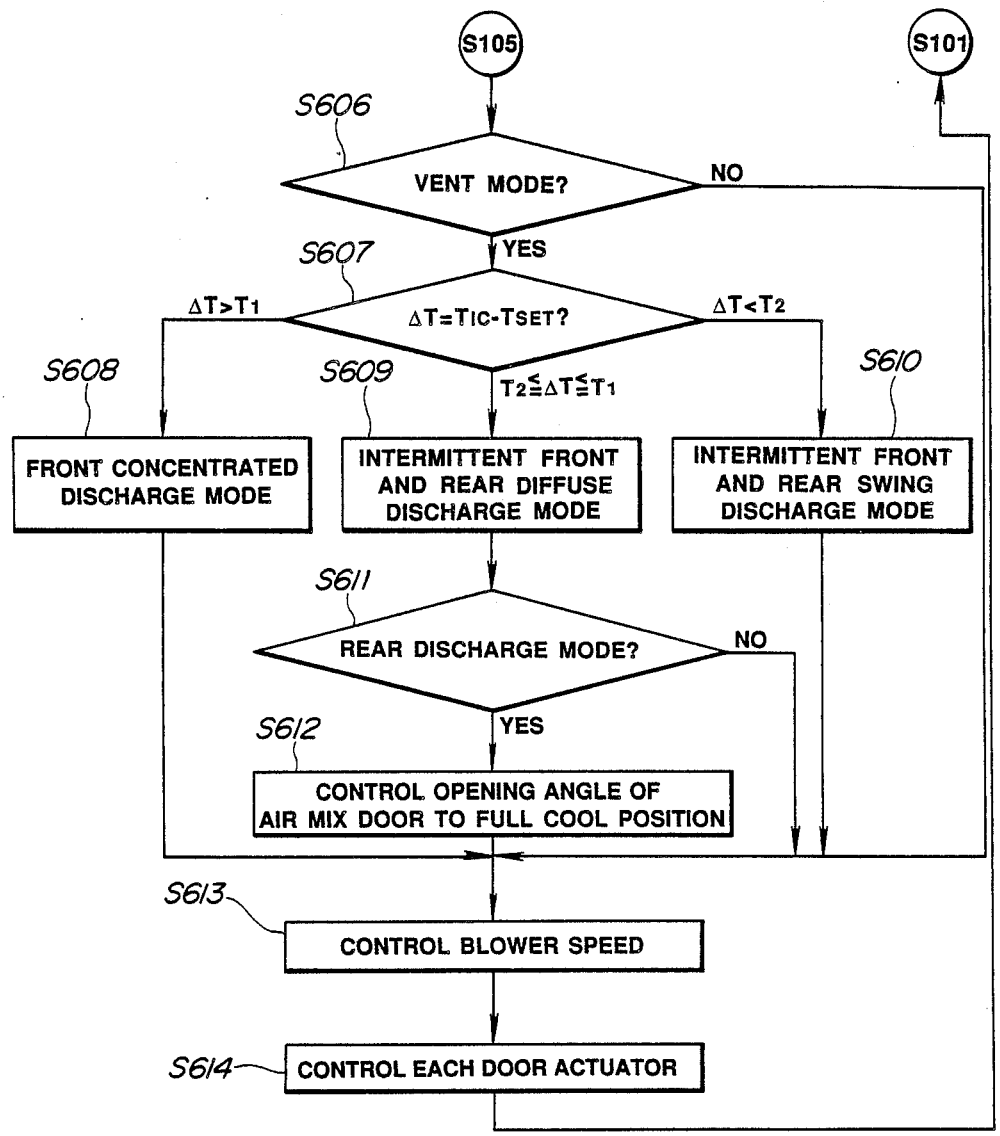
FIG. 10 is a flow chart representative of a program to control the air conditioning system according to the sixth embodiment.

The controller 41 of the sixth embodiment of the air conditioning system according to the invention will be operated in accordance with the order of steps of the flow chart shown in FIG. 10.

Figure 11:
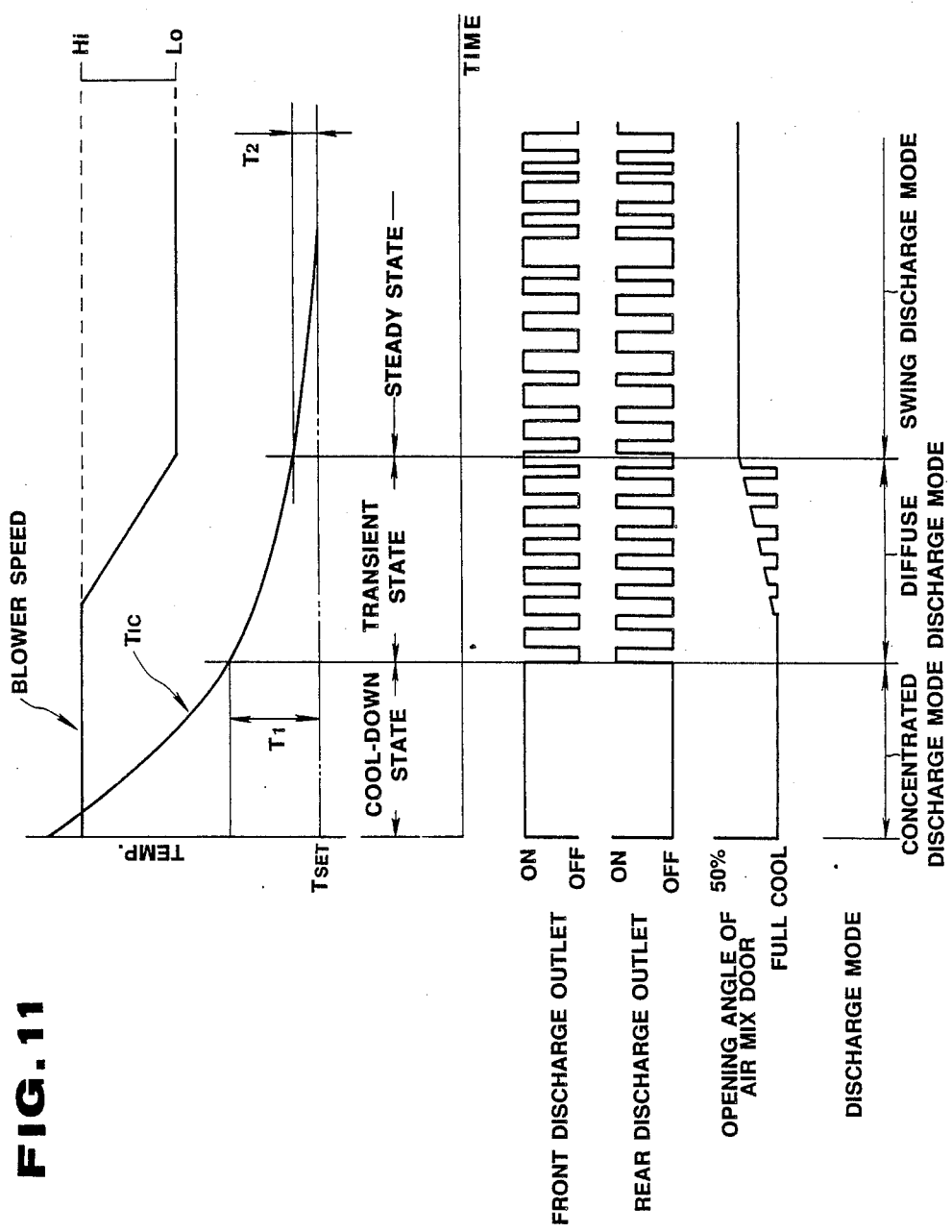
FIG. 11 shows a plurality of graphs illustrating changes in blower speed, changes in room temperature, opened and closed conditions of the front and rear discharge outlets, and changes in opening angle of the air mix door, in accordance with changes in the discharge mode.

In the sixth embodiment, steps S101 to S105 are executed previous to step S606, wherein a test is made to determine whether the selected discharge outlet mode is the VENT mode. If the answer to step S606 is negative (no), step S603 proceeds in which the impressed voltage $V_{fan}$ determined at step S102 is applied to the blower motor 27 so as to control the blower speed and then at step S614 the output circuit (not shown) of the controller 41 outputs control signals to the respective door actuators for controlling the respective opening angles of doors 38, 40A, and 40B. If the answer to step S606 is affirmative (yes), step S607 proceeds in which the difference $\Delta T$ ($T_{IC}-T_{SET}$) between the room temperature $T_{IC}$ and the preset temperature $T_{SET}$ is compared with predetermined temperatures $T_1$ and $T_2$. If the differences $\Delta T$ exceeds the temperature $T_1$, the discriminating means of the controller 41 determines that the environmental condition of the vehicular cabin 7 is in a cool-down state, and then step S608 proceeds in which the louvers 5 of the front discharge outlets 4 are operated in the front concentrated discharge mode (first discharge mode) wherein the conditioned air is concentratedly discharged through the front discharge outlets 4 in the direction of the front seats 1 and 2, thereby allowing the occupants of the front seats to quickly feel cool. In this cool-down state, according to the conventional control method of an automatic air conditioner, the air mix door 33 is generally positioned in an essentially full cool position in which the air mix door 33 prevents the air from passing through the heater core 31. If the difference $\Delta T$ is greater than or equal to the temperature $T_2$ but less than or equal to the temperature $T_1$, the discriminating means determines that the environmental condition of the vehicular cabin 7 is in a transient state between the cool-down state and the steady state, and then step S609 proceeds in which the louvers 5 of the front discharge outlet 4 and the rear discharge outlet 61 are operated in the above mentioned "intermittent front and rear diffuse discharge mode". During this mode, the vent shutter 62 is so operated as to cyclically and alternately open and close the front discharge outlets 4 and the rear discharge outlet 61. As a result, the vehicle occupants taking the front and rear seats can feel suitably cool. After step S609, the routine moves to step S611 in which a test is made to determine whether the actual discharge mode is the rear diffuse discharge mode (second rear discharge mode) or the front diffuse discharge mode (second front discharge mode). If the actual discharge mode is the front diffuse discharge mode, the routine moves to the above described steps S613 and S614 in that order. If the actual discharge mode is the rear diffuse discharge mode, step S612 proceeds in which the output circuit outputs a control signal to the air mix door actuator such that the air mix door 33 is actuated to the full cool position. In this manner, since, during the "intermittent front and rear diffuse discharge mode", the air mix door 33 is positioned in the full cool position in synchronization not with the front diffuse discharge mode, but with the rear diffuse discharge mode, the environmental conditions in the vehicular cabin 7 change smoothly. That is, conditioned air of a suitable temperature is discharged from the respective front and rear discharge outlets, alternately. In this way, the opening angle of the air mix door 33 gradually changes from substantially 100% (full cool position) to substantially 50% as best shown in FIG. 11. Furthermore, the air conditioning system can maintain cooling performance by reason of avoidance of a large thermal load due to the simultaneous discharge from both the front and rear discharge outlets. In other words, the air conditioning system according to the sixth embodiment of the invention, can prevent lowering of the cooling power thereof, during the intermittent front and rear diffuse discharge mode. As a result, the occupants of the front and rear seats may feel properly cool.

If the difference $\Delta T$ is less than the temperature $T_2$, the discriminating means determines that the environmental condition of the vehicular cabin 7 is a steady state, and then step S610 proceeds in which the louvers 5 of the front discharge outlet 4 and the rear discharge outlet 61 are operated in the previously mentioned intermittent front and rear swing discharge mode. During this mode, the vent shutter 62 is so operated as to cyclically and alternately open and close the front discharge outlets 4 and the rear discharge outlet 61 and the fins of the louvers 5 of the front discharge outlets 4 are cyclically oscillated in the right and left directions in synchronization with the front discharge mode. As a result, after engagement of the "intermittent front and rear swing discharge mode", the occupants of the front and rear seats can continuously feel suitably cool. In this manner, since, during the "intermittent front and rear swing discharge mode", the fins of the louvers 5 of the front discharge outlets 4 are cyclically oscillated in the right and left directions, the environment in the vehicular cabin 7 is uniformly cooled. This results in comfortable environmental conditions in the vehicular cabin 7 during the "intermittent front and rear swing discharge mode". In addition, the air conditioning system can maintain its cooling performance for the same reasons as in step S609. After step S610, the routine moves to steps S613 and S614 in that order. After step S614, the routine moves back to the initial step S101.

As clearly shown in FIG. 11, in the process of transition from the cool-down state to the steady state, the "intermittent front and rear diffuse discharge mode" of the discharge outlets functions such that the environmental conditions in the vehicular cabin change smoothly from the cool-down state to the steady state. As will be appreciated from FIG. 11, the cabin temperature $T_{IC}$ changes smoothly to the preset temperature $T_{SET}$ by the above mentioned three modes of discharge control in response to three states, namely, a cool-down state, a transient state, and a steady state.

As set forth above, the air conditioning system of the sixth embodiment can sufficient cooled air for discharge outlets directed to both the front and rear seats in spite of being a single air conditioner with a single evaporator. For this reason, the air conditioning system is economical.

Although, in the sixth embodiment, the predetermined temperatures $T_1$ and $T_2$ are shown on a curve illustrating the cabin temperature $T_{IC}$ in FIG. 11, temperatures $T_1$ and $T_2$ may be suitably changed depending upon the magnitude of thermal load to the automotive vehicle, such as a magnitude of insolation.

In the described first to fifth embodiments as well as the sixth embodiment, the predetermined temperatures $T_1$, $T_2$, $T_3$, $T_4$, $T_{S1}$, $T_{S2}$, $T_{G1}$, $T_{G2}$, $T_{b1}$, and $T_{b2}$ are used as control parameters for the discriminating means of the controller 41, however these control parameters may be suitably changed depending upon the magnitude of thermal load to the automotive vehicle.

While the foregoing is a description of the best mode for carrying out the invention, it will be understood that the invention is not limited to the particular embodiments shown and described herein, but may include variations and modifications without departing from the scope or spirit of this invention as described by the following claims.

What is claimed is:

1. An automatic air conditioning system for automotive vehicles having at least one discharge outlet to discharge conditioned air therethrough comprising:

sensor means for monitoring the environmental condition of said vehicular cabin for producing a sensor signal indicative thereof;

variable means associated with said discharge outlet for varying the discharge mode of the conditioned air discharged therefrom, said variable means being operable in a first discharge mode wherein said conditioned air is concentratedly discharged to an occupant of said vehicular cabin, a second discharge mode wherein said conditioned air is discharged in a manner so as to be diffused to all regions within said vehicular cabin, and a third discharge mode wherein said conditioned air is oscillatingly discharged to said occupant; and discharge control means deriving a control value indicative of a heat demand on the basis of said sensor signal and a target temperature in said vehicular cabin, said discharge control means operating said variable means at said first discharge mode when said control value is within the range of a first predetermined values satisfying a first environmental condition, at said second discharge mode when said control value is within the range of a second predetermined values satisfying a second environmental condition, and at said third discharge mode when said control value is within the range of a third predetermined values satisfying a third environmental condition.

2. An automatic air conditioning system as set forth in claim 1, wherein said third discharge mode is combined with increase and decrease in the blower speed.

3. An automatic air conditioning system as set forth in claim 1, wherein said third discharge mode is executed such that said first and second discharge modes are alternately repeated, thereby resulting in oscillation of the direction and/or the amount of discharge of said conditioned air from said discharge outlet.

4. An automatic air conditioning system for automotive vehicles having at least one front discharge outlet to discharge conditioned air to an occupant of the front seat in said vehicular cabin and at least one rear discharge outlet to discharge conditioned air to an occupant of the rear seat in said vehicular cabin comprising:

sensor means for monitoring the environmental condition of said vehicular cabin for producing a sensor signal indicative thereof;

first variable means associated with said front discharge outlet for varying the discharge mode of the conditioned air discharged therefrom, said first variable means being operable in a first front discharge mode wherein said conditioned air is concentratedly discharged to said occupant of said front seat, a second front discharge mode wherein said conditioned air is discharged in a manner so as to be diffused to a front compartment of said vehicular cabin, and a third front discharge mode wherein said conditioned air is oscillatingly discharged to said occupant of said front seat;

second variable means associated with said rear discharge outlet for varying the discharge mode of the conditioned air discharged therefrom, said second variable means being operable in a first rear discharge mode wherein said conditioned air is concentratedly discharged to said occupant of said rear seat, a second rear discharge mode wherein said conditioned air is discharged in a manner so as to be diffused to a rear compartment of said vehicular cabin, and a third rear discharge mode wherein said conditioned air is oscillatingly discharged to said occupant of said rear seat; and discharge control means deriving a control value indicative of a heat demand on the basis of said sensor signal and a target temperature in said vehicular cabin, said discharge control means operating said first variable means at said first front discharge mode when said control value is within the range of a first predetermined values satisfying a first environmental condition, at said second front discharge mode when said control value is within the range of a second predetermined values satisfying a second environmental condition, and at said third front discharge mode when said control value is within the range of a third predetermined values satisfying a third environmental condition, said discharge control means also operating said second variable means at said first rear discharge mode when said control value is within the range of a first predetermined values satisfying a first environmental condition, at said second rear discharge mode when said control value is within the range of a second predetermined values satisfying a second environmental condition, and at said third rear discharge mode when said control value is within the range of a third predetermined values satisfying a third environmental condition.

5. An automatic air conditioning system as set forth in claim 4, wherein said discharge control means preferentially controls said first variable means rather than said second variable means.

6. An automatic air conditioning system as set forth in claim 5, wherein, during the rear discharge mode said control means controls, the opening angle of the front discharge door for opening and closing said front discharge outlet or the opening angle of the rear discharge door for opening and closing said rear discharge outlet in synchronization with said front discharge modes.

7. An automatic air conditioning system for automotive vehicles having at least one front discharge outlet to discharge conditioned air to an occupant of the front seat in said vehicular cabin and at least one rear discharge outlet to discharge conditioned air to an occupant of the rear seat in said vehicular cabin comprising:

sensor means for monitoring the environmental condition of said vehicular cabin for producing a sensor signal indicative thereof;

variable means associated with said first and second discharge outlets for varying the discharge mode of the conditioned air discharged therefrom, said variable means being operable in a first discharge mode wherein said conditioned air is concentratedly discharged to said occupant of said front seat in said vehicular cabin, a second discharge mode wherein said conditioned air is alternately discharged from said front and second discharge outlets in a manner so as to be diffused to all regions of said vehicular cabin, and a third discharge mode wherein said conditioned air is oscillatingly and alternately discharged from said front and rear discharge outlets to all regions of said vehicular cabin;

shutter means for switching such that said conditioned air is alternately discharged from said front and rear discharge outlets; and discharge control means deriving a control value indicative of a heat demand on the basis of said sensor signal and a target temperature in said vehicular cabin, said discharge control means operating said variable means at said first discharge mode when said control value is within the range of a first predetermined values satisfying a first environmental condition, at said second discharge mode when said control value is within the range of a second predetermined values satisfying a second environmental condition, and at said third discharge mode when said control value is within the range of a third predetermined values satisfying a third environmental condition.

8. An automatic air conditioning system as set forth in claim 7, wherein said discharge control means controls the opening angle of the air mix door of said air conditioning system such that said air mix door is positioned in a full cool position wherein flowing air is prevented from passing through the heater core of said air conditioning system in synchronization with said second discharge mode.

9. An automatic air conditioning system for automotive vehicles having at least one discharge outlet to discharge conditioned air therethrough comprising:

sensor means for monitoring the environmental condition of said vehicular cabin for producing a sensor signal indicative thereof;

variable means associated with said discharge outlet for varying the discharge mode of the conditioned air discharged therefrom, said variable means being operable in a first discharge mode wherein said conditioned air is concentratedly discharged to an occupant of said vehicular cabin, a second discharge mode wherein said conditioned air is discharged in a manner so as to be diffused to all regions within said vehicular cabin, and a third discharge mode wherein said conditioned air is oscillatingly discharged to said occupant;

blower means for changing the amount of said conditioned air to be discharged from said discharge outlet, said blower means being operable at a first bower speed during said first discharge mode, a second blower speed less than said first blower speed during said second discharge mode, and a third blower speed combining said second blower speed and a blower speed less than said second blower speed during said third discharge mode; and discharge control means deriving a control value indicative of a heat demand on the basis of said sensor signal and a target temperature in said vehicular cabin, said discharge control means operating said variable means and said blower means at said first discharge mode when said control value is within the range of a first predetermined values satisfying a first environmental condition, at said second discharge mode when said control value is within the range of a second predetermined values satisfying a second environmental condition, and at said third discharge mode when said control value is within the range of a third predetermined values satisfying a third environmental condition.

10. An automatic air conditioning system for automotive vehicles having at least one front discharge outlet to discharge conditioned air to an occupant of the front seat in said vehicular cabin and at least one rear discharge outlet to discharge conditioned air to an occupant of the rear seat in said vehicular cabin comprising:

sensor means for monitoring the environmental condition of said vehicular cabin for producing a sensor signal indicative thereof;

variable means associated with said first and second discharge outlets for varying the discharge mode of the conditioned air discharged therefrom, said variable means being operable in a first discharge mode wherein said conditioned air is concentratedly discharged to said occupant of said front seat in said vehicular cabin, a second discharge mode wherein said conditioned air is alternately discharged from said front and second discharge outlets in a manner so as to be diffused to all regions of said vehicular cabin, and a third discharge mode wherein said conditioned air is oscillatingly and alternately discharged from said front and rear discharge outlets to all regions of said vehicular cabin;

blower means for changing the amount of said conditioned air to be discharged from said first or second discharge outlet, said blower means being operable at a first bower speed during said first discharge mode, a second blower speed less than said first blower speed during said second discharge mode, and a third blower speed less than said second blower speed during said third discharge mode;

shutter means for switching such that said conditioned air is alternately discharged from said front and rear discharge outlets; and discharge control means deriving a control value indicative of a heat demand on the basis of said sensor signal and a target temperature in said vehicular cabin, said discharge control means operating said variable means at said first discharge mode when said control value is within the range of a first predetermined values satisfying a first environmental condition, at said second discharge mode when said control value is within the range of a second predetermined values satisfying a second environmental condition, and at said third discharge mode when said control value is within the range of a third predetermined values satisfying a third environmental condition.

* * * * *